UNITED STATES PATENT OFFICE.

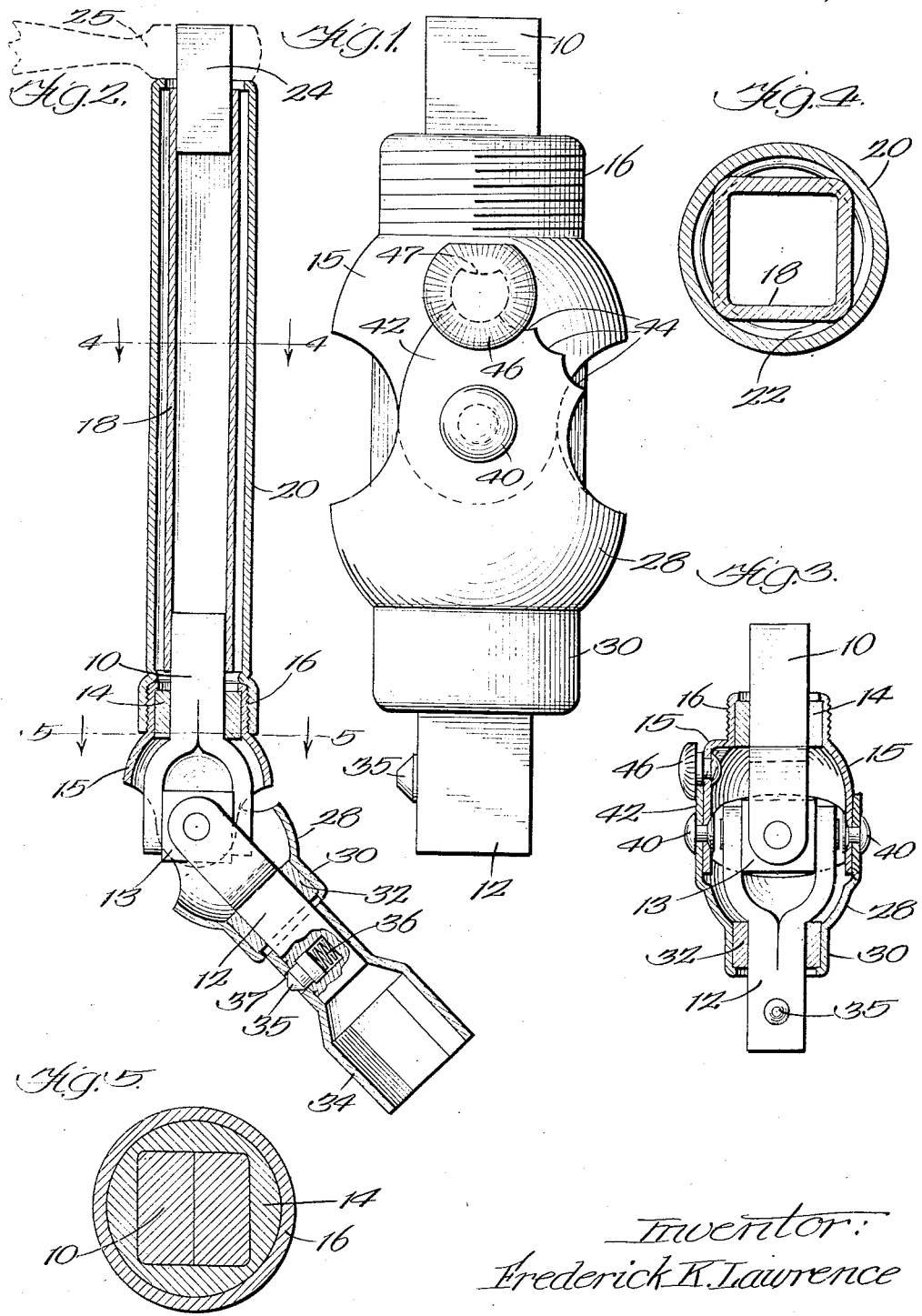

FREDERICK K. LAWRENCE, OF CHICAGO, ILLINOIS.

TURNING-TOOL.

1,395,436.

Specification of Letters Patent.   Patented Nov. 1, 1921.

Application filed March 8, 1920.   Serial No. 364,129.

*To all whom it may concern:*

Be it known that I, FREDERICK K. LAWRENCE, a citizen of the United States, residing at Chicago, in the county of Cook and State of Illinois, have invented a certain new and useful Improvement in Turning-Tools, of which the following is a specification.

My invention relates to turning tools or wrenches more particularly of the type embodying universal joints. The general object of the invention is to provide a tool adapted for use in situations in which the nuts, bolts or other objects to be turned are located where they are not readily accessible. Among the specific objects of the invention is to provide a device of this character in which the acting head and the shank of the tool may be temporarily fixed at different angles by means of locking elements which do not occupy any appreciable amount of space within the bend or elbow formed by the tool when the head of the tool is oblique to the shank. Another object is to provide a device in which the handle is separable from the parts which constitute the universal joint, thus making it possible to use handles of different lengths and types. Another object is to provide a long bearing for the inner shank-turning element within the non-rotatable handle. Another object is to provide a construction which produces strength, lightness and weight and simplicity in manufacture.

I obtain my objects by the mechanism illustrated in the accompanying drawing in which—

Figure 1 is a side elevation of the joint portion of the tool together with the yokes which inclose it.

Fig. 2 is an axial section of the complete tool.

Fig. 3 is a view taken at right angles to the view in Fig. 2 and showing the joint and yokes, the latter being in axial section.

Fig. 4 is a plan section on the line 4—4, Fig. 2.

Fig. 5 is a plan section on the line 5—5, Fig. 2.

Like numerals denote like parts throughout the several views.

The chief elements of the universal joint are the shank 10, the head 12 and the pivot block 13 to which they are pivoted upon axes arranged at right angles to each other. The shank 10 is polyangular, preferably square, in cross section and fits within a ring 14 which has a cylindrical external surface and forms a bearing for holding the shanks centered within the collar 16 of the upper yoke 15. Shank 10 also fits within the shank extension 18. The length of this extension may be varied to suit requirements. It bears within the cylindrical steadying handle 20 the length of which is preferably substantially the same as of said extension. By reference to Fig. 4 the relationship of the parts may be readily noted, the corners of the extension bearing freely against the internal cylindrical surface of the handle. At its lower end said extension rests upon the internal head or crimp 22 formed near the lower end of the handle. The handle is internally threaded at the lower end to screw onto the externally threaded collar 16 previously mentioned. When the handle is tightly screwed onto collar 16 the handle becomes rigid with the yoke 15 and the extension 18 may be rotated within the handle thus causing the universal joint to rotate. Various means may be employed for rotating the extension. In the present case I have illustrated the extension as being provided at its upper end with a stem 24 which projects beyond the handle and may be engaged by a ratchet wrench 25 or other suitable device for furnishing the necessary leverage.

As a companion to the yoke 15 is a yoke 28 which is provided with a collar 30 forming a bearing for a ring 32 which supports the acting head 12. The parts are so constructed that when head 12 is rotated it will be held centered in the collar 30 by means of the bearing ring 32. The acting head may assume various forms including a screw driver form or a boring tool form, but in the present case I have shown it as adapted to fit into the upper end of a socket 34 adapted to receive a nut or the head of a bolt. In the illustrated design the two parts are detachably held together by means of a spring pin 35 which is backed up by a spring 36 in head 12 and tends to project itself into the aperture 37 in the shank of the socket 34.

The yokes 15 and 28 are pivotally connected together by pins 40 located in line with the axis of the head 12 where it is pivoted to the block 13. In the present case these pins have heads which are riveted over to hold the parts in place. A portion 42 of the yoke 28 extends considerably above one of the pins 40 and at its edge is provided with a series of notches 44 as best shown in Fig. 1.

This extension with its notches forms a locking plate for fixing the position of the lower yoke with respect to the upper one. The locking effect is accomplished, according to the present design, by a pin 46 which is rotatable, one portion of its shank having a notch 47 so formed that when the notch is rotated opposite to the notched edge of the locking plate, said plate and the yoke of which it is a part may be rotated about the axis of pin 40, thus changing the angular adjustment of the yokes with respect to each other. When the locking pin is rotated to such portion as to bring the convex portion of its shank opposite to one of the notches in the plate 42, the shank will seat in such notch and hold the two yokes against relative rotation.

In operation, in using the tool in the form shown the operator first places the socket 34 over the nut or other object to be turned; he then grasps the steadying handle 20 in one hand and with the other hand employs a ratchet wrench or other tool 25 to rotate the stem 24, extension 18, and the parts connected thereto. By employing a ratchet wrench the user is able to operate in close quarters. He is assisted in this by reason of the shape of the device as a whole, for it will be noted that the locking of the two yokes together is accomplished by mechanism which is close fitting, so to speak, that is, is entirely confined to a space close to the working axes of the universal joint. No quadrants or other cumbersome projections are required for setting the sections at the desired angle. If any change in the obliquity of the acting head 12 is required it may be quickly and easily accomplished by simply rotating the pin 46 so as to bring the concave portion of its stem opposite to the notched edge of the plate 42 whereupon the plate will be free to rotate about the axis of the pins 40 and the yokes may be reset when the desired angularity has been obtained.

If desired, the steadying handle 20 and the extension 18 within it may be entirely dispensed with and the ratchet wrench or other turning handle applied directly to the shank 10. All that is necessary to remove the steadying handle of the extension is to unscrew the former from the threaded collar 16, whereupon the two parts may be simply lifted off. This not only permits the device to be used without a steadying handle but it also makes it possible to substitute other steadying handles of greater or less length. It also enables the user to work in confined situation.

It will be noticed that the yokes 15 and 28 are shell-like in form, as a result of which they form a housing or casing for virtually inclosing the universal joint. This has several advantages: it protects the joint, improves the appearance of the device as a whole, and makes it possible to employ sheet metal without losing anything in strength and rigidity.

Having thus described my invention what I claim as new and desire to secure by Letters Patent is:

1. A turning tool having a universal joint, yokes pivotally connected together and each having a collar surrounding one part of the universal joint for steadying the same, a steadying handle fastened to one of said yokes, said handle having a cylindrical inner surface and an extension making a running fit with the inside of the handle, said extension being connected to one part of the universal joint for rotating it, and means for rotating said extension relatively to the handle.

2. A turning tool having a universal joint, one element of the joint having a polyangular stem, yokes pivotally connected together at said joint and having means for fixing their angular relationship, an extension interfitting with said stem, and a cylindrical tubular handle of considerable length for steadying the device, said extension being polyangular and fitting rotatably within said handle throughout the entire length of said extension.

In witness whereof, I have hereunto subscribed my name.

FREDERICK K. LAWRENCE.